Patented Aug. 11, 1953

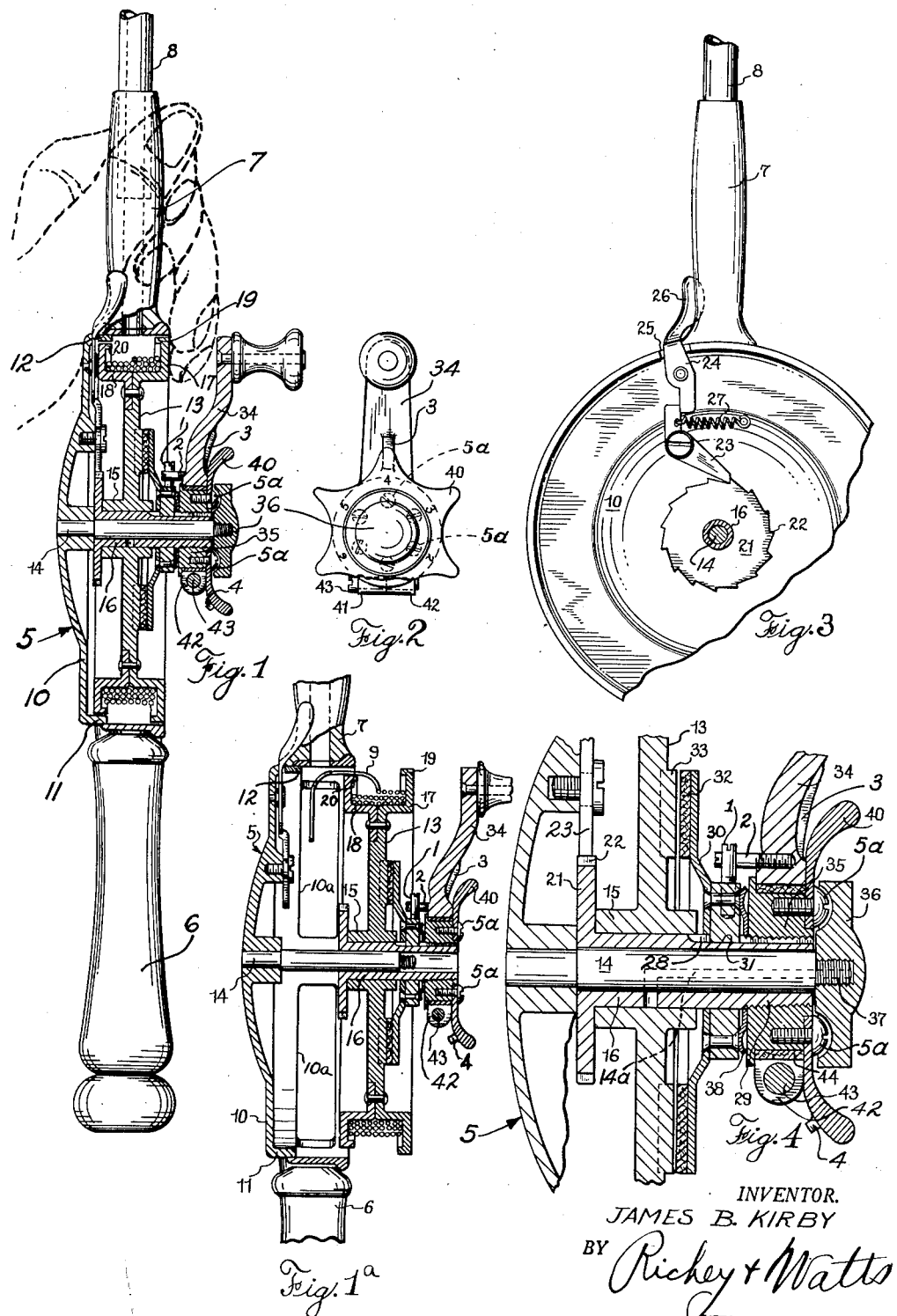

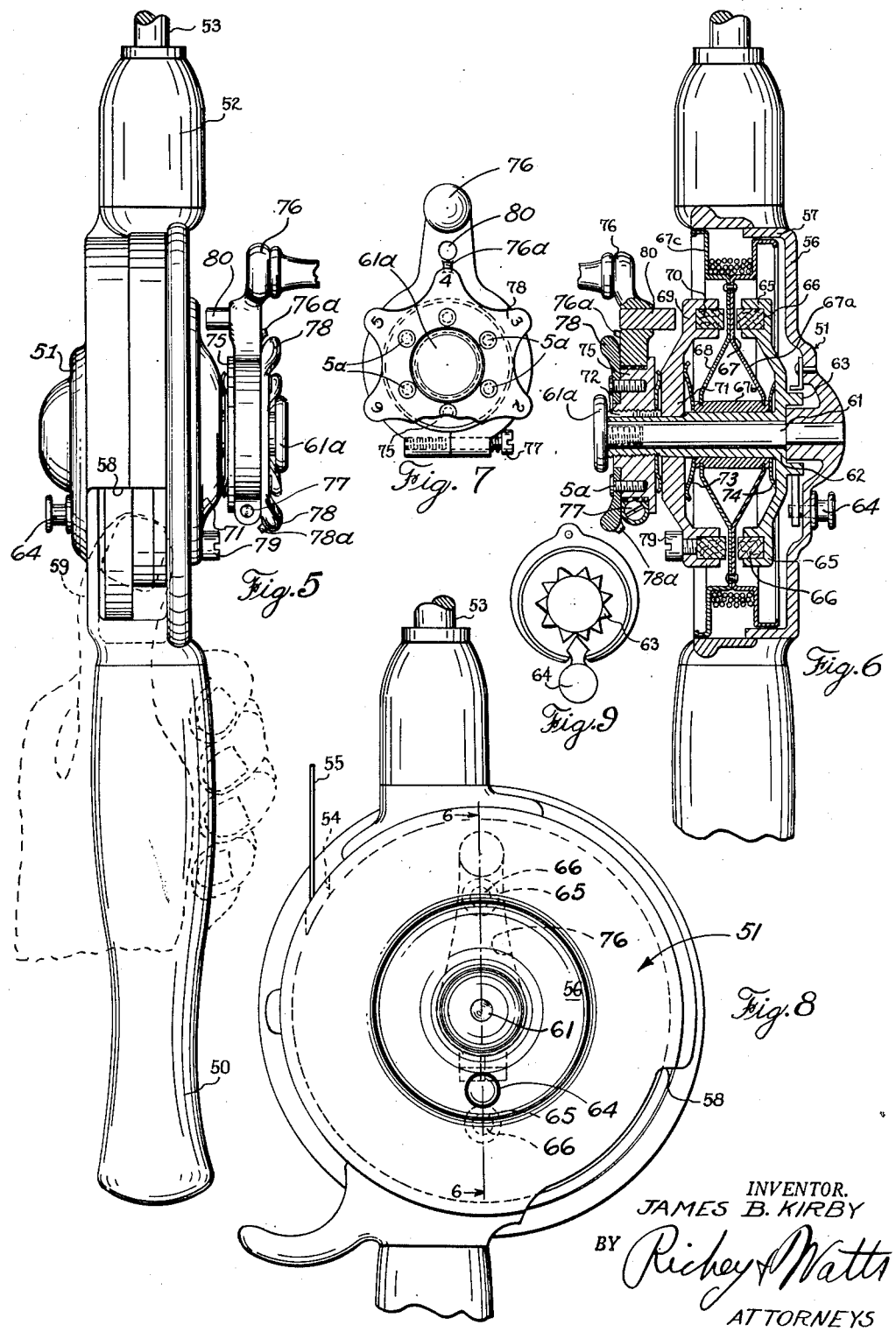

2,648,506

UNITED STATES PATENT OFFICE 2,648,506

FISHING REEL

James B. Kirby, West Richfield, Ohio

Application April 29, 1949, Serial No. 90,420

4 Claims. (Cl. 242—84.5)

This invention relates to fishing reels and more particularly to an improved reel construction providing more efficient control by the fisherman over the movement of the line, the loads imposed thereon and more effective handling of the bait or lure.

It is among the objects of my invention to provide a fishing reel having a spool and a winding crank carried on a rotatable member, wherein when the crank is turned in one direction, with respect to the member, the spool is free and when turned in the opposite direction, with respect to the member, the spool is engaged to be rotated by the crank.

It is a further object of my invention to provide a reel having a spool for the line and a hand operated crank wherein the winding or unwinding directional rotation of the crank effects a limited axial movement of the crank with respect to the spool so that the turning of the crank in one direction establishes a driving relation between the crank and the spool and wherein the turning of the crank in an opposite direction will interrupt the drive between the crank and the spool or impose a frictional drag between the crank and spool.

It is a further object of my invention to provide a control for the spool of a fishing reel wherein the spool is free to turn with respect to the winding crank when the crank is turned in an unwinding direction and is frictionally engaged to be rotated by the crank when the crank is turned in a winding direction.

It is a further object of my invention to provide a reel according to the preceding objects wherein the clutching and declutching movement of the winding crank is limited to about one revolution and wherein the clutch engaging pressure obtained by such winding crank movements may be adjusted within relatively wide limits so that the reel may be adjusted to properly handle various line load conditions.

It is a further object of my invention to provide a reel according to the preceding object in which the reel provides a visual indication of the clutch pressure adjustment.

Other objects and advantages relating to ease in handling, simplicity in construction and efficiency in operation will appear from the following description and the appended drawings wherein:

Fig. 1 is a sectional view of a heavy tackle or salt water reel made according to my invention;

Fig. 1a is a sectional view showing the reel being removed from the reel supporting spindle;

Fig. 2 is an elevation of the hand crank and adjusting device embodied in the reel of Fig. 1;

Fig. 3 is an elevation with parts in section showing the click brake or ratchet employed in the reel of Fig. 1;

Fig. 4 is an enlarged sectional view with parts broken away of the reel shown in Fig. 1;

Fig. 5 is a plan view of a light tackle reel made according to my invention;

Fig. 6 is a sectional view taken on the plane indicated at 6—6 of Fig. 8;

Fig. 7 is an elevation with parts broken away showing the crank adjustment means for the reel of Fig. 6;

Fig. 8 is an elevation of the reel of Fig. 5 taken on that side of the reel opposite the crank; and Fig. 9 is an elevation showing the click mechanism in the Fig. 5 form of my invention.

Referring to the drawings, the deep sea or trolling reel of Figs. 1–4 is indicated in its entirety as at 5 and is incorporated in a rod having the handle 6 and the handle extension beyond the reel as at 7 secured to the rod 8. The reel includes a circular frame casting 10 secured to the handle as at 11 and to the handle extension 7 as at 12. Preferably the body is cast of a light metal such as magnesium or aluminum and the peripheral flange of the frame substantially surrounds the spool 13 supported within the casting by a spindle 14 and is provided with openings such as 10a, one of which is used to lead the line 9 out through the frame.

The spool is mounted for free rotational movement at its hub 15 on a crank sleeve 16 which is in turn mounted for rotation on the spindle 14. The spindle 14 is preferably provided with a longitudinal bore and a transverse intersecting bore adapted to be aligned with an opening through the sleeve 16, as at 14a, so that the mechanism may be lubricated from time to time by dropping lubricant into the spindle opening at the end thereof normally closed by the nut 36. The periphery of the spool is provided with an integrally formed flange 17 and a complementary flange 18, which flanges have opositely extending peripheral shoulders 19 and 20, respectively, to guide the line and insure an even winding of the line on the spool and thereby eliminate the need for any level wind mechanism such as is ordinarily used. The flange 17 is disposed so that the fingers of the left hand of the fisherman may conveniently be brought to bear against it as shown in Fig. 1. At the same time the base of the thumb is in a position to operate the ratchet release 26. The base of the handle is normally held in a seat socket or harness and thus the rod is secured by the left hand and the right hand is on the crank ready for crank manipulation. The sleeve 16, which serves as a bearing for the hub 15 of the spool, is flanged at its inner end as at 21 and the periphery of this flange is provided with teeth 22 (best shown in Fig. 3) to cooperate with a ratchet brake. Pivotally carried on the inner wall of the case or body 10 are a pair of cooperating ratchet brake levers 23 and 24. The lever 24 of this sub-assembly projects radially outward through a slot in the body, as at 25, to provide a manually operated handle 26. The inner lever or pawl 23 is arranged to be urged inwardly about its pivot by spring 27 to engage the teeth on the periphery of the flange 21. With the parts in the position shown in Fig. 3, the flange and sleeve 16 are limited to a clockwise rotation and it will be understood as the description proceeds that this is the normal position of the parts. This prevents a reverse spinning of the crank which might injure the user. When, however, it is desired to turn the spool in an unwinding direction so as to feed the line out of the reel, the ratchet 23 may be released by swinging the lever 26 about its pivot. This release is conveniently accomplished by the pressure exerted at the base of the thumb of the hand gripping the handle portion 7.

The sleeve 16 is provided with a groove or keyway 28 which extends for about half of the axial extent of the sleeve, and the outermost portion of the exterior of the sleeve is threaded as at 29. A clutch member 30 is provided with a hub having a key portion as at 31 adapted to fit loosely in the keyway or groove 28 on the sleeve. That face of the clutch 30 adjacent the spool 13 is provided with a flat ring of friction material 32 arranged to bear against an integrally formed annular ring 33 on the spool. It will be noted that this arrangement provides that when the friction clutch is engaged across the annular face 32—33 and a turning movement imparted to the sleeve is transmitted to the spool, any tendency of the spool to turn relative to the sleeve is resisted by a frictional drag across the face 32—33. Fig. 1 shows the reel parts with the clutch in an engaged position so that turning the crank in a positive or winding direction will rotate the spool and Fig. 4 shows the reel parts in a clutch released position so that the spool may turn freely with respect to the clutch and crank. A crank 34 carries an internally threaded hub 35 adapted to receive the threads 29 at the outer end of the sleeve 16. The assembly comprising sleeve 16, spool 13, clutch 30 and crank 34 are held in their assembled relation on the spindle 14 by the threaded nut 36 carried on the threaded spindle extension 37. A light spring washer 38 may be interposed between the hub 31 of the clutch and the hub 35 of the crank assembly.

The threaded engagement between the crank and the sleeve 16 is a "right-hand" thread so that the initial turning of the crank 34 in a clockwise direction turns the hub 35 with respect to the sleeve 16 when the sleeve is retarded by the ratchet brake or by index finger contact at flange 17 so that the crank assembly moves bodily along the axis of the sleeve to the left as shown in Figs. 1 and 4. This results in applying pressure to the clutch plate 30 through the medium of the spring washer 38.

I am aware that it has been heretofore proposed to provide a frictional drive between the crank and spool of a fishing reel and to vary the frictional characteristics of such a drive by some adjustable means. It appears, however, that all of such prior art expedients required some manipulation that would make it necessary for the fisherman to let go of the handle 7 with his left hand or of the winding crank with his right hand. It will be understood by those familiar with this art that it is desirable that the fisherman retain his grip on the handle 7 and on the winding crank for the reel at all times. This is achieved according to my invention. For instance, where the reel of my invention is in use with the parts arranged as shown in Fig. 1, that is, with a substantial length of line run out from the reel for trolling and the left hand in the position shown in this figure gripping the handle portion 7 and the right hand holding the knob on the crank 34. The clutch parts are in full engaged position so that positive rotation of the crank, that is, a turning of the crank in a winding direction will drive the spool so as to wind the line back on the reel. Since the ratchet 23 is engaged to prevent a counter-clockwise turning of the sleeve 16, a turning of the crank in an unwinding direction releases the clutch engagement so as to free the spool and permit the line to unwind in response to the drag of the bait in the water. It is an important feature of my invention that the clutch and the crank, respectively, be provided with limit stops so as to limit the relative rotation between the crank and the clutch to about one revolution.

The periphery of the clutch hub 31 is provided with a radially projecting screw or pin 1, and the crank 34 carries an axially projecting pin or screw 2 that is carried in a circular path so as to engage the pin 1, as illustrated in Figs. 1 and 4. This arrangement provides that rotation of the crank 34, relative to the clutch 30, is limited in amount to about one revolution from a full "on" position, as shown in Fig. 1, to a full "off" position as shown in Fig. 4. It will be noted that with the parts in the position shown in Fig. 4, a turning of the crank 34 in a clockwise direction will bring the pin 2 around to a position on the forward side of the pin 1 so that the stops 1 and 2 limit relative crank and clutch rotation in both directions. Since the pawl and ratchet 22—23 in normal position, as shown in Fig. 3, prevents counter-clockwise rotation of the crank in response to a pull on the line, a movement of the crank in a counter-clockwise direction will move the pin 2 from its position, as shown in Fig. 1, around to the position shown in Fig. 4, and thus effects a full release of the clutch.

The torque transmitting ability of the clutch in response to the "on" and "off" movements of the crank may be changed by an adjustment of the crank hub 35 with respect to the crank 34. Referring to Fig. 1, where the clutch is in a full "on" position as determined by the crank movement, it will be noted that a clockwise rotation of the hub 35 will move the hub and crank by reason of the threaded engagement of the hub to the left and thus increase the clutch pressure. Conversely, a turning of the hub 35 in a counter-clockwise direction will move the same to the right and thus decrease the clutch pressure without changing the relative position of the crank and clutch as determined by the pins 1 and 2.

On the exterior end face of the threaded crank hub 35 there is secured the star shaped member 40 carrying the indicia 1—6, as shown. The crank is adjustably secured around the hub 35 by means of the split clamp portions 41 and 42 integrally formed with the body of the crank. A clamping screw 43 extends through the portion 41 and is threaded through the portion 42 so that upon release of the set screw, the crank portion 34 may be turned angularly with respect to the hub 35. Preferably a band of friction material 44 is arranged between the crank and the hub so that the crank is frictionally gripped about the hub when the screw 43 is tightened. It will be noted that this arrangement will permit the hub portion 35 to be turned on the threads of the sleeve 16, with respect to the crank, and the crank thereafter tightened on the hub 35 by the screw 43 to change the relative axial position between the crank 34 and the sleeve 16 without changing the angular relation between the crank and clutch. Thus the clutch pressure may be changed without disturbing the stop pin arrangement 1—2 on the clutch and crank.

That portion of the crank 34 adjacent the threaded crank hub 35 is provided with a rib 3 and the star wheel 40 carried by the hub 35 is provided with a lug or rib 4 in the circular path described by the rib 3 of the crank. This arrangement limits the relative rotation during the manual adjustment of the hub and crank to about one revolution. Since the star wheel carries the indicia 1 to 6, and the rib 3 of the crank provides indicia projecting beyond the star wheel, the relative position of the hub 35 and crank is indicated visually as shown in Fig. 2. The star wheel 40 is secured to the hub 35 by means of six screws indicated at 5a, each screw being located on a radius extending from the center of the star wheel to a point thereof. This arrangement of the attaching means for the star wheel and hub provides for a relative angular adjustment of the star wheel with respect to the hub. The adjustment is effected by removing the assembly nut 36 and thereafter removing the six screws 5 and turning the star wheel bodily, with respect to the hub and crank, to any of six different positions and then reinserting the screws 5 to hold the parts assembled as shown in Fig. 4. It will be appreciated that the star wheel adjustment may be made by the fingers of the right hand while the crank knob is held by the palm of the right hand.

In the event the line should be subjected to a pull exceeding any predetermined clutch engagement effected by relative crank and clutch positioning, the spool will slip in a counterclockwise direction unless the fisherman increases the clutch engagement by a clockwise turning of the crank handle 34 with respect to the clutch. The tendency of the spool and clutch to turn counter-clockwise provides the resistance required in the sleeve 16 for the relative crank rotation and thus within the limits imposed by the pins 1 and 2, clockwise rotation of the crank increases the torque transmitting ability of the clutch. With the ratchet brake in an "off" position, that is with the pawl 23 moved beyond the path of the teeth 22, spool movement may be arrested by the application of the pressure from the fingers of the left hand as shown in Fig. 1. This method of manipulation is useful where there is no pull on the line 9 and it is desired to turn the spool in an unwinding direction by counter-clockwise turning of the crank. The spool may be held by the finger pressure on flange 17 and the desired clutch pressure obtained by turning the crank in a clockwise direction, then upon release of the fingers from the spool, the crank may be turned in a counter-clockwise direction to positively feed the line off the reel. In this manner, a fisherman may with his left hand grip the handle 7, release the ratchet on the sleeve and arrest the spool motion, while with his right hand on the crank, he may set the clutch pressure and then turn the crank and spool counter-clockwise.

In Figs. 5 to 9 inclusive, I have shown my reel invention as embodied in a light tackle casting reel, wherein the reel 51 is incorporated in a casting rod having a handle 50, a grip portion 52 and the shaft 53. As is usual in this type of tackle, the shaft 53 is solid and the reel frame is provided with an opening 54 through which the line 55 is guided. The body or frame of the reel comprises a circular casting 56 that is provided with a flange 57 at its periphery. The flange 57 is cut away, as at 58, so that the user may conveniently press the thumb, as indicated at 59, against the flange 60 of the line carrying spool. The center portion 56 of the frame has pressed therein a spindle 61 which serves as a journal for the sleeve 62 mounted thereon. The sleeve 62 is provided with a notched flange 63 adapted to cooperate with a click brake mechanism 64 and is provided with a pair of opposed clutch buttons 65 carrying friction material 66 in position to bear against the web 67 of the spool 68. Cooperating clutch buttons 69 having a friction material 70 carried thereby are keyed, as at 71, in the keyway or groove 72 formed in the outer end of the sleeve 62. A pair of spring washers 73 and 74 are arranged on opposite sides of the hub of the spool so as to normally urge the two clutch members 65 and 69 from each other to free the spool as shown in Fig. 6. The outer end of the sleeve 62 is threaded to receive a threaded crank hub 75 so that when the crank is turned in a clockwise direction (as shown in Fig. 5) the hub 75 will move axially by reason of the threaded engagement and cause the cooperating clutch members 65 and 69 to grip the web of the spool. When, however, the spool is restrained by the thumb 59, as shown in Fig. 5, and the crank hub 75 turned counter-clockwise the clutch is released and the clutch parts moved to the position shown in Fig. 6 in response to the urging of the spring washers 73 and 74. The crank 76 is connected to the hub 75 by means of a split ring and adjusting screw 77 constructed and arranged substantially as in the embodiment shown in Fig. 1. It will be understood that the member 78, carried by the crank hub 75, may carry indicia showing the clutch adjustment as in the first described embodiment. The outer clutch member 69 is provided with a projecting cap screw 79 in the circular path described by the pin 80 carried by the crank 76. This arrangement provides a limit stop in each direction to limit the relative rotational movement between the crank 76 and the clutch member 69. The star wheel 78 and the crank 76 are provided with cooperating lugs 78a and 76a, respectively, to limit the crank-to-hub adjustment substantially as in that form of my invention illustrated in Figs. 1 to 4. The star wheel 78 is secured to the hub 75 by six screws 5a in the manner and for the purposes as described in the first embodiment. The entire assembly is maintained in assembled relation by the spindle nut 61a.

The spool of the casting reel preferably comprises a pair of light metal stampings such as, for instance, magnesium secured to each other in the web portion thereof by a rivet or the like. The central area of the stampings is punched out and the spaced apart portions 67a secured to the hub 67b. The peripheral portions 67c are spaced apart to provide a channel for the line wound in the spool. It will be noted that in both forms of my invention that the side of the spool adjacent the frame has a smaller diameter than the outer side of the spool. This proportioning of the spool flange diameters permits the spool to be removed bodily from the frame, as shown in Fig. 1a, without cutting the line.

In the operation the light tackle or casting reel form of the invention is used substantially as in the embodiment of Figs. 1 to 4 in that the clutching and de-clutching between the crank and the spool is controlled by the right hand motions of the user. It is also to be understood that various amounts of clutch engagement between the "full-clutch" engagement, as provided by the limit stops and the "no-clutch" engagement so as to free the spool, are effected by relative movement between the crank handle and the cooperating clutch members 65 and 69. The click brake which is of more or less conventional construction may be left in the "on" position, as shown in Fig. 9, or moved to an inoperative position where the lever of the click brake is out of the path of the teeth carried on the flange 63.

Although I have shown and described in considerable detail two forms of my invention, it will be appreciated that numerous modifications may be made therein without departing from the scope of the invention as defined in the following claims.

What is claimed is:

1. A fishing reel comprising a body, a spindle projecting from the body, a sleeve rotatably mounted on said spindle, a spool rotatably mounted on the sleeve, a crank, means to mount said crank on said sleeve including a crank hub threaded on the sleeve, a clutch element nonrotatably mounted on the sleeve adapted to be moved into and out of driving engagement with the spool by rotation of the hub on the sleeve, a projection carried by the crank, a projection carried by said clutch element, said projections describing a common circular path upon relative crank and sleeve rotation, whereby such rotation is limited, said crank being angularly adjustable on the hub and indicia carried by the hub and crank to show the relative angular position of said projections.

2. A support, a member rotatably mounted on the support, a spool rotatably mounted on the member, a friction clutch element nonrotatably mounted on the member and movable axially thereof into and out of engagement with the spool, a winding crank rotatably mounted on said member, stop means on the crank and member to limit the relative rotational movement of the crank with respect to the member to about one revolution and provide a positive drive between the crank and clutch element.

3. A fishing reel comprising a rotatable shaft, a spool rotatably mounted on the shaft, a hub screw threaded on said shaft, a friction member axially slidable on the shaft and engageable with the spool and the hub whereby rotation of the hub in one direction moves the friction member axially of the shaft to effect a driving engagement between the hub and spool, and rotation of the hub in the opposite direction releases the spool for free rotation on said shaft, a handcrank for turning the hub, an abutment on the hand crank, a cooperating abutment fixed against rotation with respect to the shaft, said abutments being engageable to limit rotation of the hub with respect to the shaft in said one direction, and means for varying the angular relationship between the hub and crank.

4. A fishing reel comprising a rotatable member, a spool mounted for free rotation on the member, a friction clutch for coupling said spool to said member, a crank rotatably mounted on said member at one side of said spool, said crank having a portion rotatable therewith operatively associated with said friction clutch, said portion and said member having cooperating camming surfaces arranged to force said friction clutch into engagement upon rotation of said crank relative to said member in one direction and to release said clutch upon relative rotation thereof in the opposite direction, interengageable abutments rotatable with said crank and said member, respectively, and adapted to engage to limit relative rotation of said crank and said member, and means accessible from the outside of said crank for adjusting the angular position of engagement of said abutments relative to the angular position of said camming surfaces.

JAMES B. KIRBY.

References Cited in the file of this patent

UNITED STATES PATENTS

| Number | Name | Date |
|---|---|---|
| 812,817 | Bryan | Feb. 20, 1906 |
| 1,281,261 | Andreas | Oct. 15, 1918 |
| 1,547,238 | Russell et al. | July 28, 1925 |
| 2,193,723 | Mitchell-Henry | Mar. 12, 1940 |
| 2,257,023 | Ray | Sept. 23, 1941 |
| 2,269,808 | Cabassa | Jan. 13, 1942 |
| 2,329,381 | Bannister | Sept. 14, 1943 |